(12) United States Patent
Thompson

(10) Patent No.: US 9,422,968 B2
(45) Date of Patent: Aug. 23, 2016

(54) ENCAPSULATED FASTENER AND METHOD AND TOOLING FOR MANUFACTURING SAME

(71) Applicant: Steven L. Thompson, Girard, KS (US)

(72) Inventor: Steven L. Thompson, Girard, KS (US)

(*) Notice: Subject to any disclaimer, the term of this patent is extended or adjusted under 35 U.S.C. 154(b) by 86 days.

(21) Appl. No.: 13/855,536

(22) Filed: Apr. 2, 2013

(65) Prior Publication Data

US 2013/0223953 A1    Aug. 29, 2013

Related U.S. Application Data

(63) Continuation-in-part of application No. 13/038,207, filed on Mar. 1, 2011, now abandoned, which is a continuation of application No. 12/750,493, filed on Mar. 30, 2010, now Pat. No. 7,896,751, which is a continuation of application No. 11/829,846, filed on Jul. 27, 2007, now abandoned, which is a continuation-in-part of application No. 11/186,605, filed on Jul. 21, 2005, now Pat. No. 7,250,003.

(51) Int. Cl.
    *F16B 37/14*    (2006.01)
    *F16B 33/00*    (2006.01)

(52) U.S. Cl.
    CPC .............. *F16B 37/14* (2013.01); *F16B 33/004* (2013.01); *F16B 33/008* (2013.01); *Y10T 29/49948* (2015.01)

(58) Field of Classification Search
    CPC ........................... F16B 37/14; F16B 33/004
    USPC ........... 411/372.5, 372.6, 373, 377, 429, 431
    See application file for complete search history.

(56) References Cited

U.S. PATENT DOCUMENTS

| | | | |
|---|---|---|---|
| 1,727,590 A * | 9/1929 | Ferry | 411/430 |
| 2,795,144 A * | 6/1957 | Morse | 74/17.8 |
| 3,471,158 A | 10/1969 | Solins | |
| 3,618,444 A * | 11/1971 | Kay | F16B 37/14 411/373 |
| 3,620,119 A | 11/1971 | King, Jr. et al. | |
| 3,693,495 A * | 9/1972 | Wagner | 411/377 |
| 4,400,123 A | 8/1983 | Dunegan | |
| 4,557,654 A | 12/1985 | Masuda et al. | |
| 4,815,920 A | 3/1989 | Morooka | |
| 4,883,399 A | 11/1989 | MacLean | |
| 4,887,950 A | 12/1989 | Sakayori et al. | |
| 4,907,929 A | 3/1990 | Johnston Jr. | |
| 4,962,806 A | 10/1990 | Nottelmann et al. | |
| 4,962,968 A * | 10/1990 | Caplin | 301/108.5 |
| 5,380,070 A | 1/1995 | FitzGerald | |

(Continued)

*Primary Examiner* — Flemming Saether
(74) *Attorney, Agent, or Firm* — Law Office of Mark Brown, LLC; Christopher M. DeBacker; Mark E. Brown

(57) ABSTRACT

An encapsulated fastener includes a nut having a face with a concave gap adapted to receive a bolt. The nut is encapsulated by an encapsulation including an extension, which includes a tube adapted for receiving a portion of the bolt and a flange adapted for engaging a face of the nut. The encapsulation extension is placed on the nut in an overmolding tool, wherein an encapsulation base is injection molded over a portion of the encapsulation extension. The encapsulation base encapsulates the nut and extends into the nut concave gap forming a base foot and washer protrusion. The nut is encapsulated except for its bore which is sealed off during the overmolding process by a spring-mounted mandrel. Alternative embodiments of the invention include tubes with different configurations for contacting the bolt whereby the tube or cylinder is reinforced. A method and tooling for manufacturing the encapsulated fastener are also provided.

5 Claims, 13 Drawing Sheets

(56) References Cited

U.S. PATENT DOCUMENTS

| | | |
|---|---|---|
| 5,553,984 A | 9/1996 | Smith |
| 5,624,218 A | 4/1997 | Dauwalter |
| 5,697,143 A | 12/1997 | Barfield |
| 5,836,072 A | 11/1998 | Sullivan et al. |
| 5,906,463 A * | 5/1999 | Damm et al. ................ 411/369 |
| 6,001,294 A | 12/1999 | Inaba et al. |
| 6,096,256 A | 8/2000 | Aretz |
| 6,135,691 A | 10/2000 | Nadarajah et al. |
| 6,641,382 B2 | 11/2003 | Mine |
| 6,739,813 B1 | 5/2004 | Gundy et al. |
| 7,250,003 B2 | 7/2007 | Thompson |
| 7,896,751 B2 | 3/2011 | Thompson |
| 2014/0030042 A1 * | 1/2014 | Sugitani ................ 411/429 |

* cited by examiner

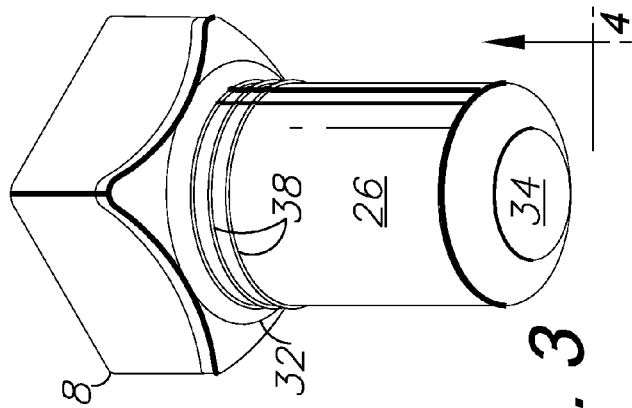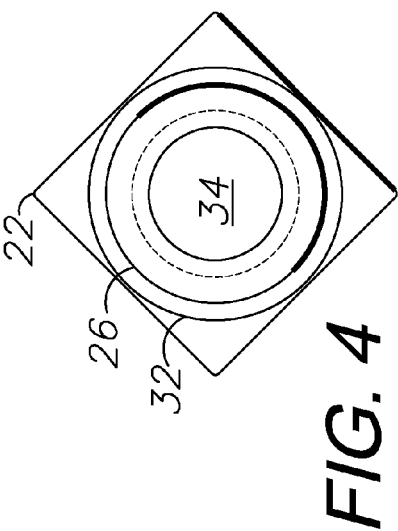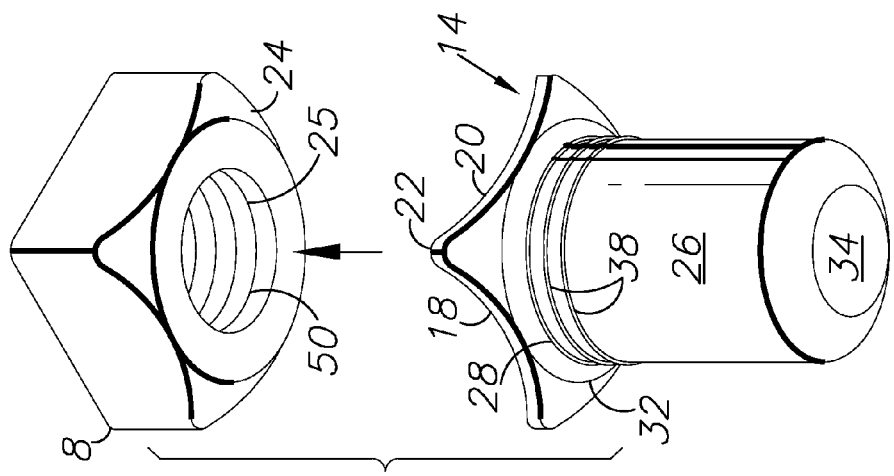

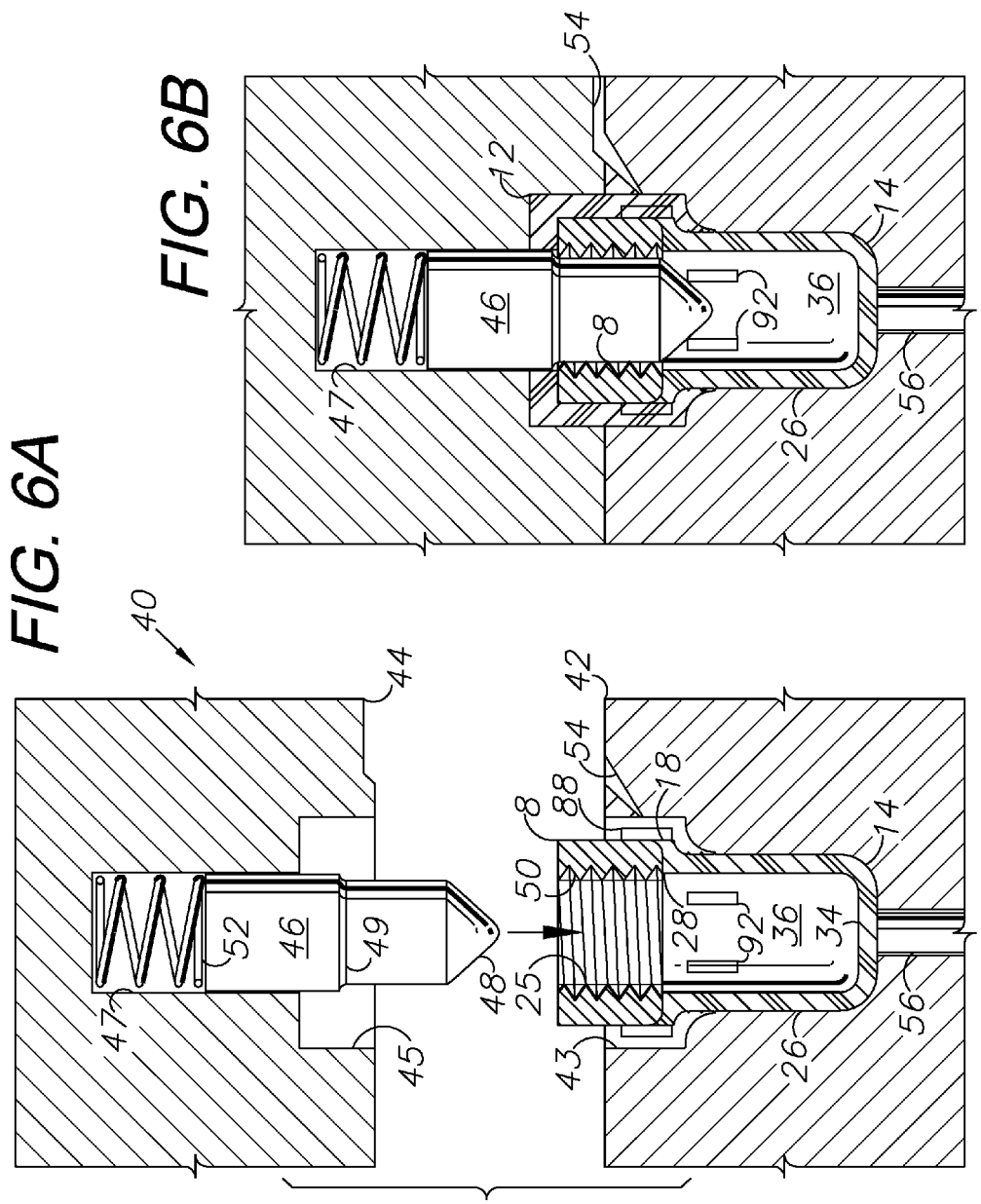

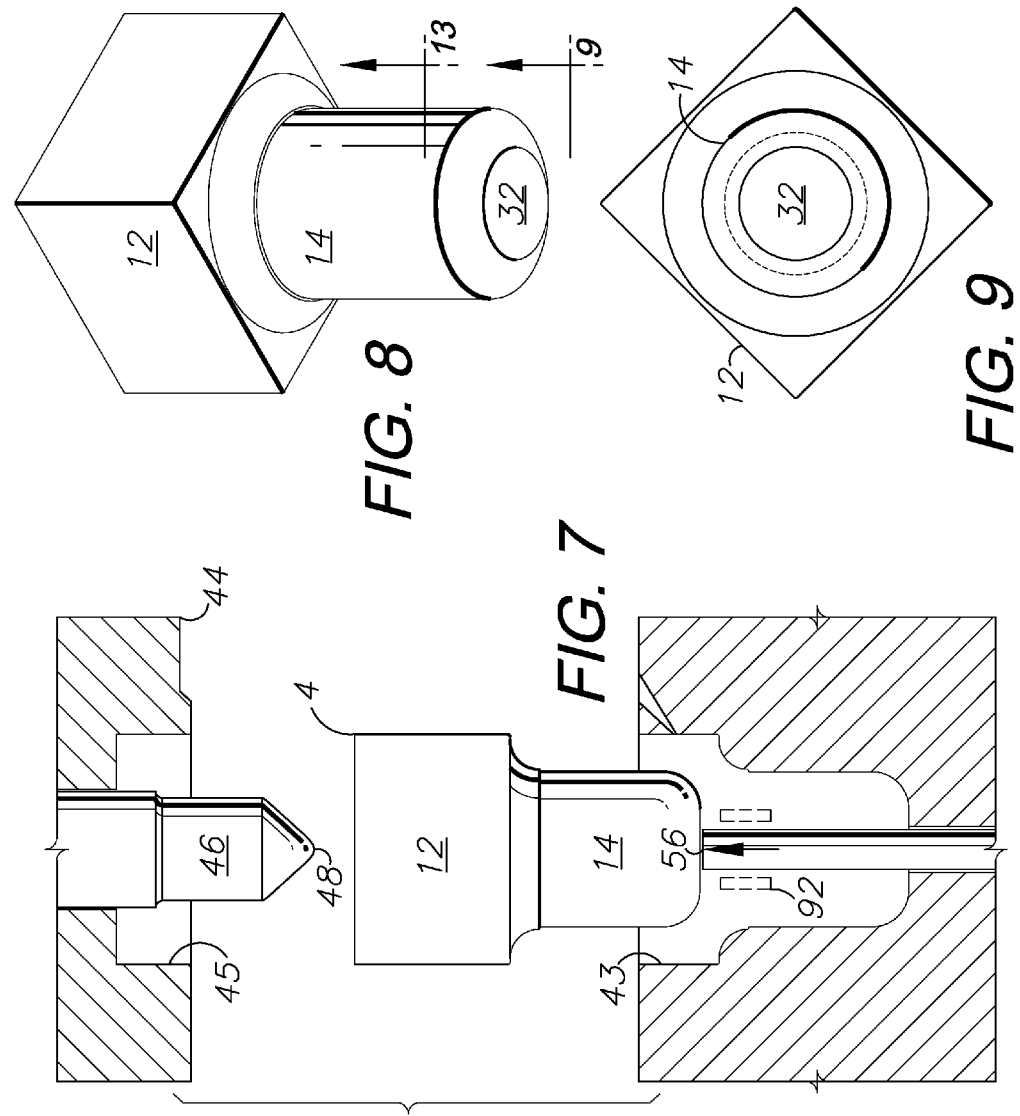

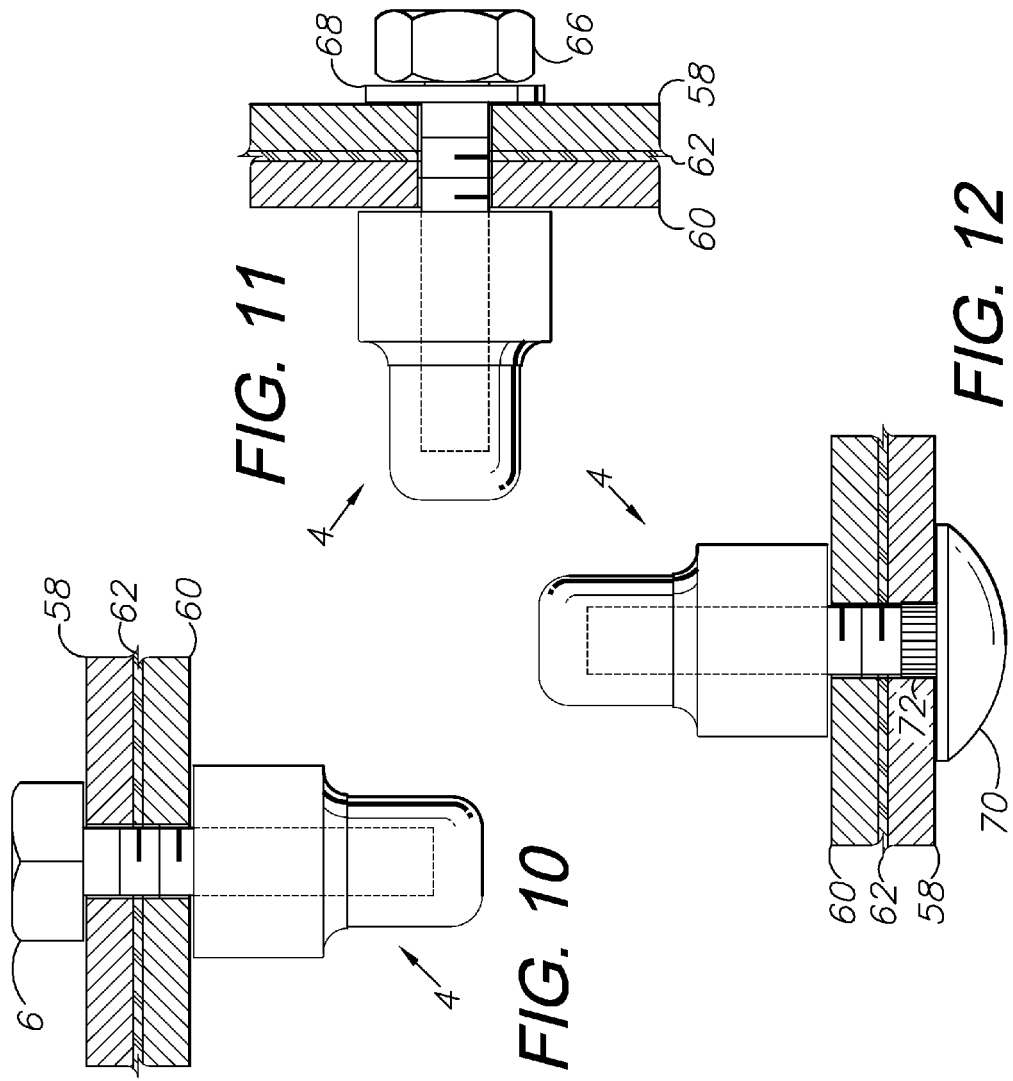

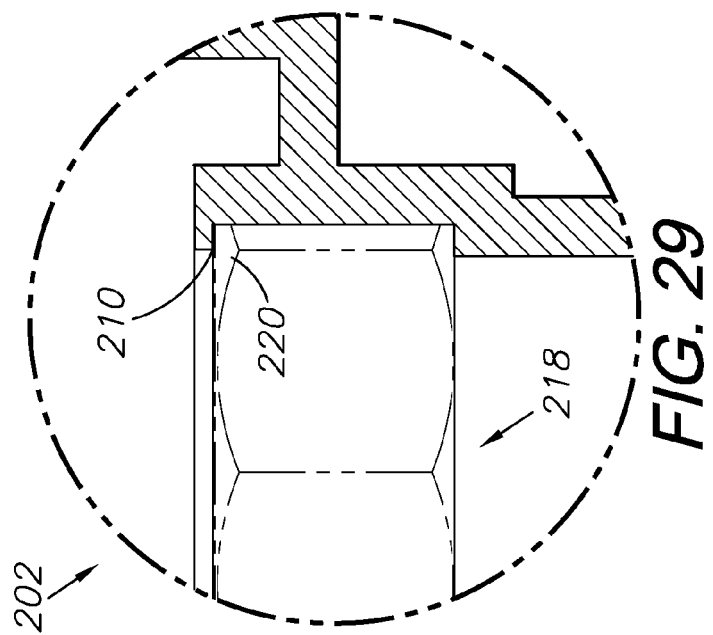
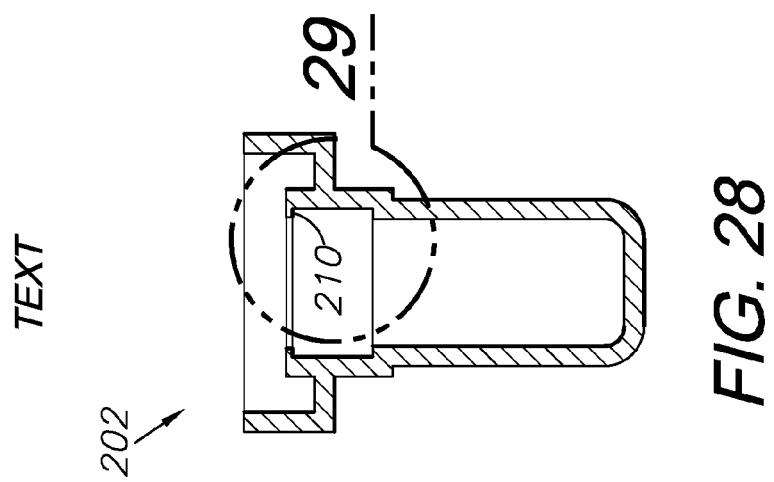

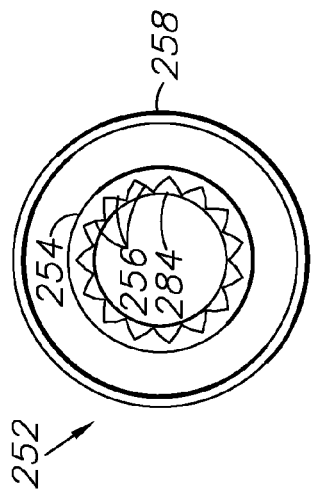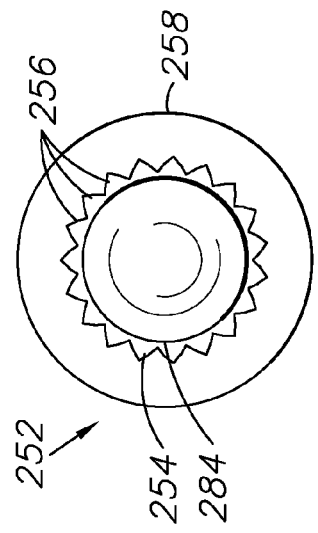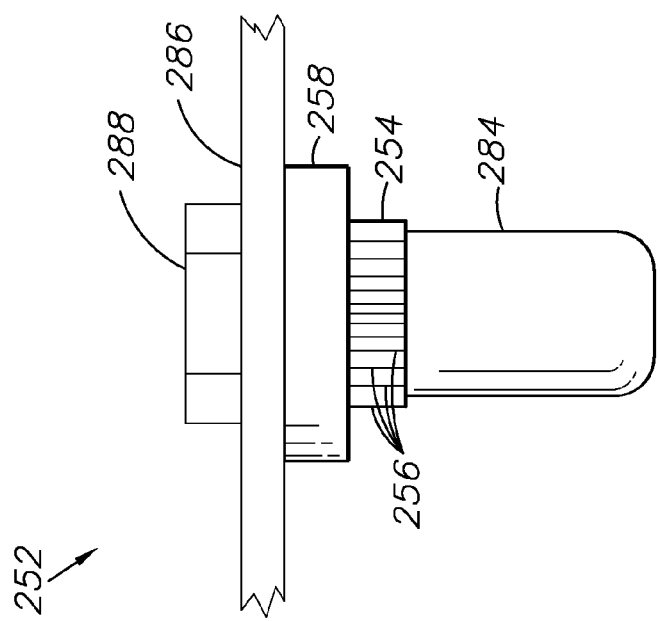

ENCAPSULATED FASTENER AND METHOD AND TOOLING FOR MANUFACTURING SAME

CROSS-REFERENCE TO RELATED APPLICATIONS

This application is a continuation-in-part and claims the benefit of U.S. patent application Ser. No. 13/038,207, filed Mar. 1, 2011, which is a continuation of U.S. patent application Ser. No. 12/750,493, filed Mar. 30, 2010, now U.S. Pat. No. 7,896,751 issued Mar. 1, 2011, which is a continuation of U.S. patent application Ser. No. 11/829,846, filed Jul. 27, 2007, now abandoned, which is a continuation-in-part of U.S. patent application Ser. No. 11/186,605, filed Jul. 21, 2005, now U.S. Pat. No. 7,250,003, issued Jul. 31, 2007, all of which are incorporated herein by reference in their entireties.

BACKGROUND OF THE INVENTION

1. Field of the Invention

The present invention relates generally to fasteners, and in particular to an encapsulated fastener and a method and tooling for manufacturing same.

2. Description of the Related Art

Mechanical fasteners are available in a wide variety of designs, which accommodate various objects being joined. The specific fastener design features are generally determined by such criteria as the functional requirements of the applications, the static and dynamic loads imposed thereon, the materials being fastened and the operating environment.

Threaded fasteners include bolts, nuts, screws, threaded rods and the like. An advantage of such fasteners is that they can be tightened and loosened with readily available hand and power tools. Consequently, threaded fasteners are used extensively in construction, manufacturing and other industries.

Although steel is a logical material choice for many fasteners based on high strength and low cost, many steel alloys are susceptible to rust, corrosion and galvanic action. Such effects can be countered in some applications by making the fasteners of stainless steel and other alloys that are resistant to rust and corrosion. However, such materials tend to be relatively expensive or ineffective in applications requiring the cost-effectiveness and material strength of steel. Another solution is to zinc-coat (i.e. galvanize), paint or otherwise provide surface protection for the fasteners. However, such solutions can be ineffective in highly corrosive liquid environments, such as salt water, wastewater, process chemicals, acid compounds and base compounds. Examples of highly corrosive dry materials include fertilizers, calcium chloride and other caustic powders and granular materials. In addition to corrosion resistance, impact and abrasion resistance are important design objectives for fasteners installed in severe service applications.

Fasteners that can withstand such severe service conditions are used extensively in the construction of tanks and other vessels for processing, storing and transporting highly corrosive liquids and solid bulk materials. Various applications for such fasteners are found in a number of industries, including petrochemical, manufacturing, agriculture, transportation, construction, defense, etc.

For example, large tanks and storage vessels are commonly constructed on site using prefabricated steel panels, which can be coated or lined with suitable corrosion-resistant materials. Bolting the panels together on site tends to be a relatively efficient and cost-effective construction method. Moreover, bolts and nuts have the advantage of installing with basic hand and power tools.

The prior art includes bolts and nuts encapsulated in injection-molded plastics, which can provide the necessary chemical resistance and other physical characteristics for these applications. For example, snap-on and spin-on plastic covers have previously been utilized for protecting the exposed portions of nut-and-bolt fasteners. The prior art also includes deep metal nuts with blind-end threaded receivers with sufficient lengths to enclose the bolts. Such nuts can be coated with anti-corrosive materials. However, such specialized fasteners tend to be more expensive than standard-size nuts. Moreover, manufacturing techniques generally require gripping the extended nuts by their interior internal threads in order for the entire exterior surface to be effectively coated. Another prior art nut encapsulation technique involves encapsulating standard size nuts in plastic materials with extensions adapted for receiving the bolt shafts protruding from the nuts. Problems with such encapsulation configurations include misalignment between bolt and extension internal threads and unsupported extensions when the extension bores are oversized to avoid contact with the bolt shafts received therein.

Heretofore there have not been available an encapsulated fastener and a method and tooling for manufacturing same with the advantages and features of the present invention.

BRIEF DESCRIPTION OF THE INVENTION

In the practice of an aspect of the present invention, an encapsulated fastener is provided, which includes a two-part encapsulation comprising a base encapsulating a nut having a concave shoulder forming a gap at a face, and an extension encapsulating a portion of a bolt extending from the base. A manufacturing method embodying the present invention includes the steps of injection molding the encapsulation extension, placing it on a nut and overmolding the base over the nut whereby a portion of the overmolding extension forms a washer protrusion and a base foot engaging the nut gap. Tooling for the manufacturing method embodies another aspect of the invention.

BRIEF DESCRIPTION OF THE DRAWINGS

FIG. 2 is a perspective view of a nut and an encapsulation extension.

FIG. 3 is a perspective view of the nut placed on the encapsulation extension.

FIG. 4 is a distal end view of the encapsulation extension.

FIG. 6A is a cross-sectional view of an overmolding tool for encapsulating nuts according to the present invention, shown in an open position with the nut and the encapsulation extension in place.

FIG. 6B is another cross-sectional view of the overmolding tool, shown in a closed position with the nut fully encapsulated.

FIG. 7 is another cross-sectional view of the overmolding tool, shown in an open position with the encapsulated nut being ejected.

FIG. 8 is a perspective view of an encapsulated nut embodying another aspect of the present invention.

FIG. 9 is a distal end view thereof.

FIG. 10 is a cross-sectional view of an application of the encapsulated nut.

FIG. 11 is a cross-sectional view of another application of the encapsulated nut.

FIG. 12 is a cross-sectional view of another application of the encapsulated nut.

FIG. 28 is a cross-sectional view thereof.

FIG. 29 is a detailed cross-sectional view taken about the circle inscribed on FIG. 28.

FIG. 32 is a side elevational view thereof.

FIG. 33 is a top plan view thereof.

FIG. 34 is a bottom plan view thereof.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning. The invention can be fabricated in various sizes and configurations from a wide variety of suitable materials, which are chosen for their characteristics according to the intended use and the operation of the invention. For example, engineered plastics, such as glass-filled nylon, can be chosen for such characteristics as chemical resistance, rigidity and toughness. Without limitation on the range of suitable materials for manufacturing the encapsulated fasteners and practicing the manufacturing method, a wide range of plastics and other formable materials can be utilized to satisfy the applicable performance, manufacturing and cost parameters.

II. Encapsulated Nut 2

Figure 1:
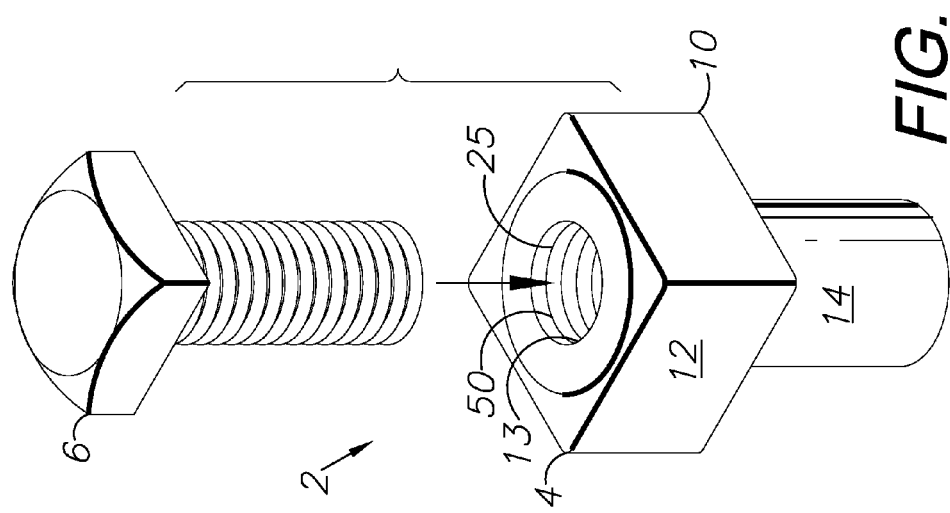
FIG. 1 is a perspective view of a fastener including an encapsulated nut embodying an aspect of the present invention.

Referring to FIG. 1 in more detail, the reference numeral 2 generally designates a fastener comprising an encapsulated nut 4 adapted for threadably receiving a bolt 6. The encapsulated nut 4 includes a nut 8 within an encapsulation 10 generally comprising an encapsulation base 12 and an encapsulation extension or hat 14. The nut 8 includes a nut bore 25 and is shown with a four-sided configuration, although hex nuts and other shapes could be employed with the present invention. As shown in FIGS. 2-4, the nut 8 is adapted for placement on the encapsulation extension 14. The encapsulation extension or hat 14 includes a flange 18, which can have a concave proximal face 20 with corners 22, which are turned to form the concave configuration and accommodate the nut 8, which has a corresponding convex face 24 adapted for mating with the concave proximal face 20 of the flange 18 whereby the nut 8 can be supported on the extension 14 in a predetermined, aligned configuration, as shown in FIG. 3. The extension also includes a distal cylinder 26 with a proximal end 28, which intersects the flange 18 at an annular junction 32, which can be radiused or filleted as shown for greater strength. The extension cylinder 26 includes a closed, distal end 34 whereat an inner, cylinder bore 36 terminates, thus providing the cylinder 26 with a closed-end configuration for encapsulating a portion of the bolt 6. The cylinder 26 also includes multiple (e.g., two are shown), annular rings 38, which are located distally from the junction 32. The encapsulation extension 14 can be fabricated by any suitable process, such as injection molding, casting, etc. using any suitable materials, such as engineered plastics, thermoplastics, glass-filled nylon, etc.

Figure 5:
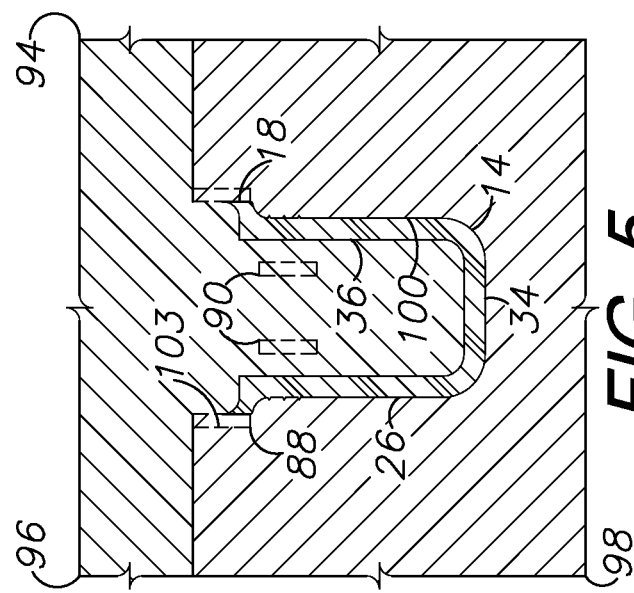
FIG. 5 is a cross-sectional view of a tool for injection molding the encapsulation extension.

FIG. 5 shows a tool 94 for injection molding the encapsulation extension 14. The tool 94 can comprise any suitable mold, such as an injection mold as shown with upper and lower mold halves 96, 98 and a mold cavity 100. FIGS. 6A, 6B and 7 show an overmolding tool 40 adapted for overmolding the encapsulation base 12 over the nut 8, the flange 18 and a portion of the cylinder 26 at a secure, fused interface adjacent to the cylinder proximate end 28. The overmolding tool 40 is shown in an open position in FIG. 6A and includes a first or lower mold half 42 with a first or lower cavity 43 adapted to receive the encapsulation extension 14 and a second or upper mold half 44 with a second or upper cavity 45, which includes a spring-mounted mandrel 46 reciprocably received in a mandrel receiver 47. The mandrel 46 includes a conical end 48 and a shoulder 49 adapted for engaging the nut 8 in a secure, sealing connection with the internal threads 50 of the nut bore 25 with the mandrel 46 located within the nut 8, as shown in FIG. 6B (tool 40 closed). In this configuration the mandrel 46 substantially seals the nut bore 25 and the extension cylinder bore 36 whereby plastic is excluded during the encapsulation base 12 overmolding step.

The spring-compressed close fit of the nut convex face 24 and the flange proximal face 20 further seal the encapsulation extension 14 against the injected overmolding plastic. The mandrel 46 is biased downwardly by a compression spring 52, which is adapted for accommodating variations in thicknesses of nuts 8 and tends to press the nut convex face 24 tightly and sealingly against the flange proximal face 20.

A subgate 54 is formed in the overmolding tool 40 for receiving the molten material for molding the encapsulation base 12, which preferably fuses with the portion of the encapsulation extension 14 exposed within the lower mold cavity 43. The distal-most ring 38 provides a stop for the encapsulation base 12 material. FIG. 7 shows the upper mold half 44 raised and an ejector pin 56 protruding upwardly into the lower mold cavity 43 for engaging the cylinder distal end 34 and ejecting the completed encapsulated nut 4.

FIGS. 1, 8 and 9 show the completed encapsulated nut 4. The two-step process of molding the encapsulation extension 14 and overmolding the encapsulation base 12 on the nut 8 and a portion of the encapsulation extension 14 results in a relatively strong, impact-resistant assembly. The encapsulation base 12 includes an opening 13, which is aligned with and has approximately the same diameter as the nut bore 25. The opening 13 is formed by the mandrel 46. The encapsulation parts 12, 14 preferably fuse in the overmolding process and thereby attain strength characteristics similar to a monolithically molded encapsulation.

Applications of fasteners embodying aspects of the present invention are shown in FIGS. 10-12. FIG. 10 shows first and second plates 58, 60 with a gasket 62 therebetween and a square-headed bolt received in an encapsulated nut 4. FIG. 11 shows a hex bolt 66 with a washer 68. FIG. 12 shows a carriage bolt 70 with a finned neck 72. In all of these applications, and various others not shown, the encapsulation 10 of the present invention effectively protects the nut 8 and the bolts 6, 66, 70 from the contents of a vessel or other structure enclosed by the plates 58, 60. As shown in FIGS. 10-12, the fasteners embodying the present invention can be installed in various orientations. The overmolding of the encapsulation base 12 provides a strong and secure interface with the nut 8 whereby sufficient force can be applied with a wrench or similar tool in order to tightly torque the fasteners 2.

Figure 13:
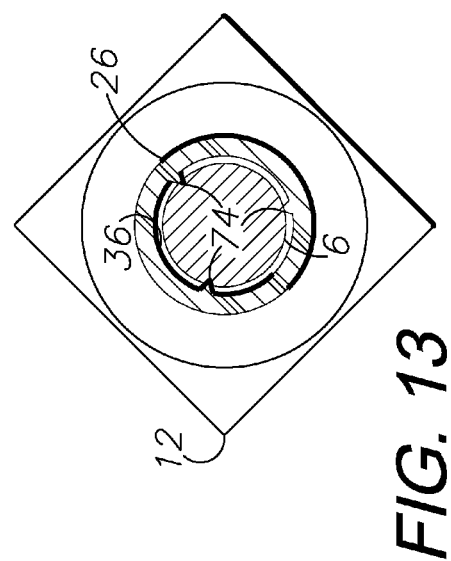
FIG. 13 is a cross-sectional view of the encapsulated nut taken generally along line in FIG. 8.
Figure 14:
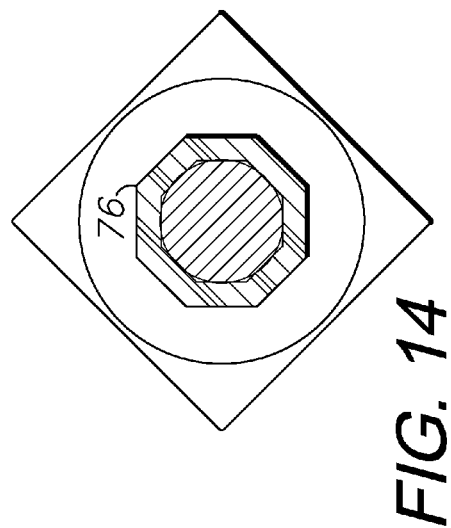
FIG. 14 is a cross-sectional view of an encapsulated nut embodying another aspect of the present invention.
Figure 15:
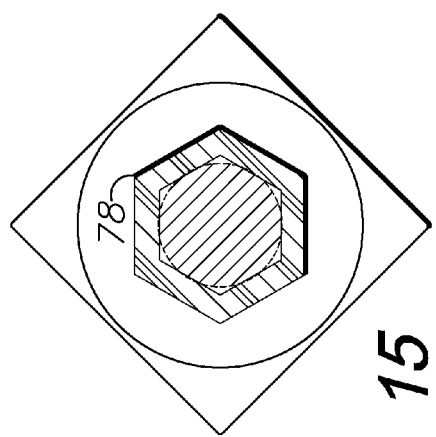
FIG. 15 is a cross-sectional view of an encapsulated nut embodying another aspect of the present invention.
Figure 16:
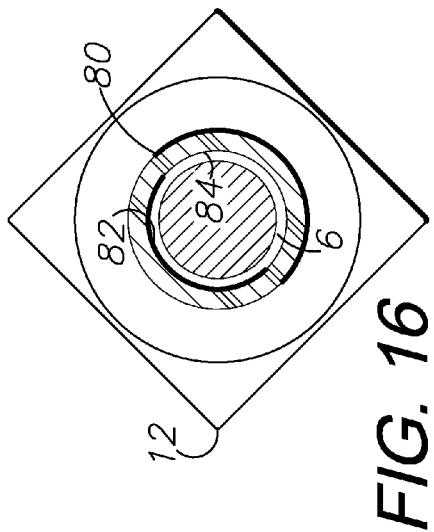
FIG. 16 is a cross-sectional view of an encapsulated nut embodying another aspect of the present invention.

FIGS. 13-16 show alternative configurations for the extension cylinder, which can be adapted for structural reinforcement through contact with the bolt 6. FIG. 13 shows multiple (e.g., three are shown) splines 74 within the bore 36 of the extension cylinder 26. The shaft of the bolt 6 (dashed lines) is in contact with the splines 74, whereby the extension cylinder 26 is reinforced by the bolt 6 and is thus more impact-resistant. FIG. 14 shows a modified, octagonal extension tube 76, which contacts the bolt 6 along each of its eight sidewalls. FIG. 15 shows a similar, hexagonal extension tube 78. FIG. 16 shows an oversized cylindrical tube 80 with a bore 82 having an inside diameter greater than the outside diameter of the bolt 6, whereby an annular clearance space 84 is formed therebetween. This configuration avoids any interference between the bolt 6 and the extension cylinder 80, which may be preferred in some applications. Other constructions within the scope of the present invention can include interference-fitting cylinders with smaller inside diameters, internal threading within the cylinder 26 aligned with the nut internal threads 50, and other variations providing interference and interference-free clearance. The cylinder bore 36 can receive various sealant, adhesive and epoxy compounds for enhancing the strength, impact-resisting and sealing characteristics of the installed fasteners.

Figure 18:
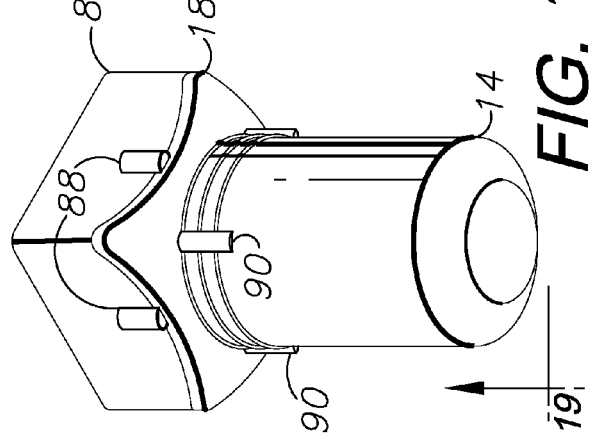
FIG. 18 is a perspective view of a nut and encapsulation extension embodying another aspect of the present invention.
Figure 19:
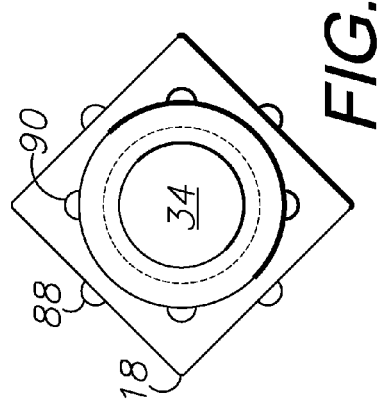
FIG. 19 is a distal end elevational view thereof.
Figure 17:
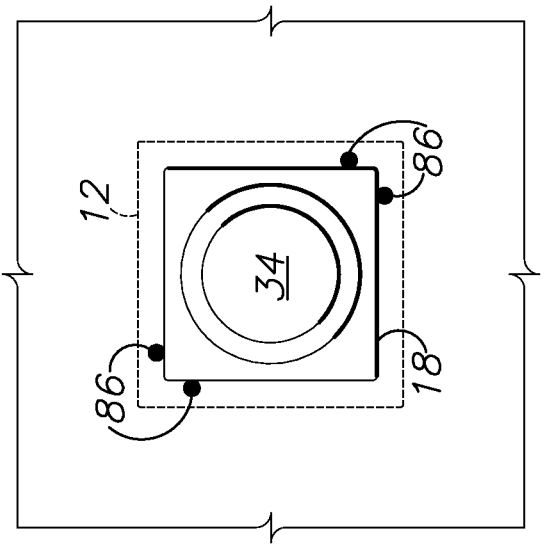
FIG. 17 is a distal end view of the encapsulation extension, shown in a mold with corner locator/ejector pins.

FIG. 17 shows two pairs of locator/ejector pins 86, which can be located at opposite corners of the nut 8 and under the encapsulation base 12 (dashed lines) whereby the nut 8 is positioned prior to the overmolding step during which the pins 86 are retracted (e.g., into the lower mold half 42) and after which they extend to eject the completed encapsulated nut 4. FIGS. 18 and 19 show locating spurs 88 formed on the edges of the flange 18 for engaging the sides of the nut 8. The locating spurs 88 can be molded in optional subcavities 103 in the injection molding tool 94 (FIG. 5). Alignment ribs 90 are provided on the encapsulation extension cylinder 26, e.g. at 90° radial spacing, for maintaining the encapsulation extension 14 in proper alignment within the lower mold half 42. The alignment ribs 90 can be formed in the injection molding tool 94 (FIG. 5) and received in optional alignment rib receivers 92 (FIGS. 6A, 6B and 7) for properly aligning the encapsulation extension 14 within the lower mold half 42.

Figure 22:
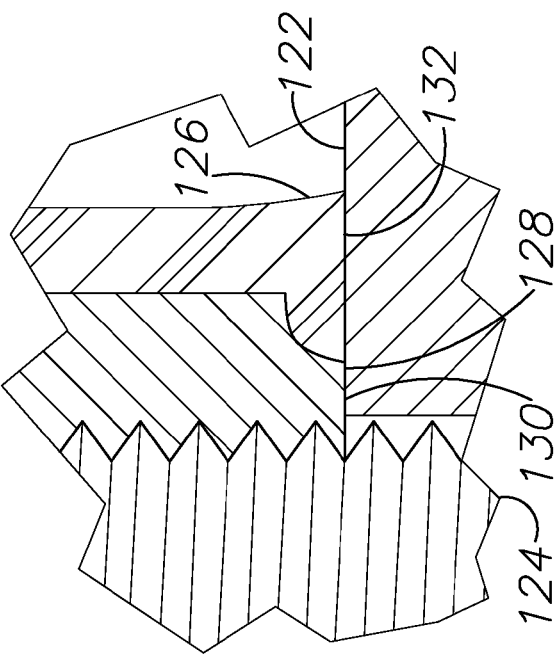
FIG. 22 is an enlarged, fragmentary cross-sectional view thereof, shown with the nut tightened on a bolt against a surface.
Figure 21:
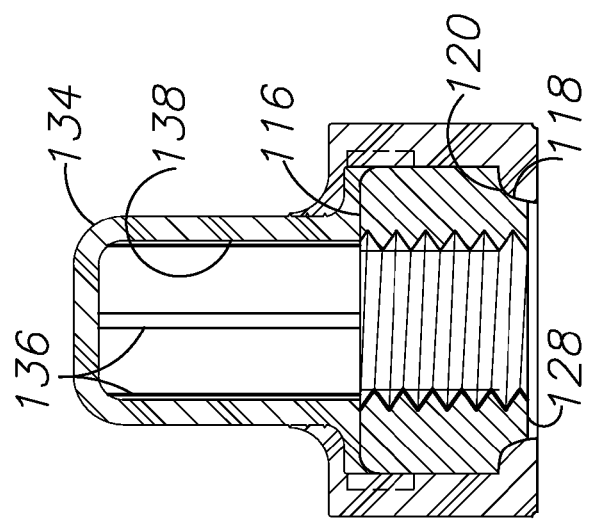
FIG. 21 is a cross-sectional view thereof.
Figure 20:
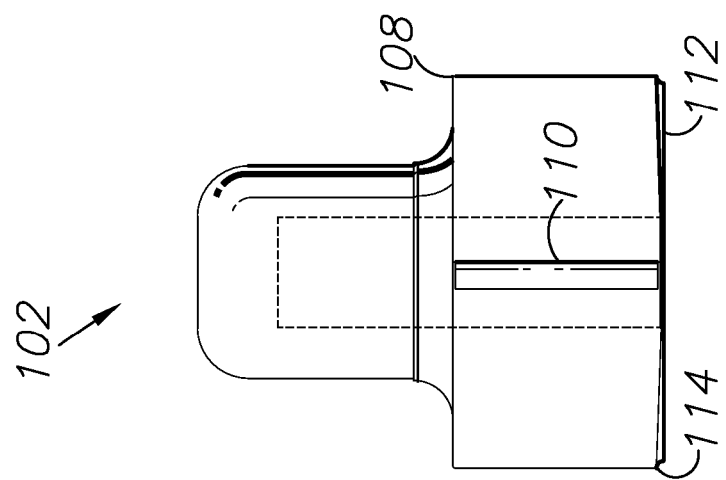
FIG. 20 is a side elevational view of end encapsulated nut embodying another aspect of the present invention.
Figure 24:
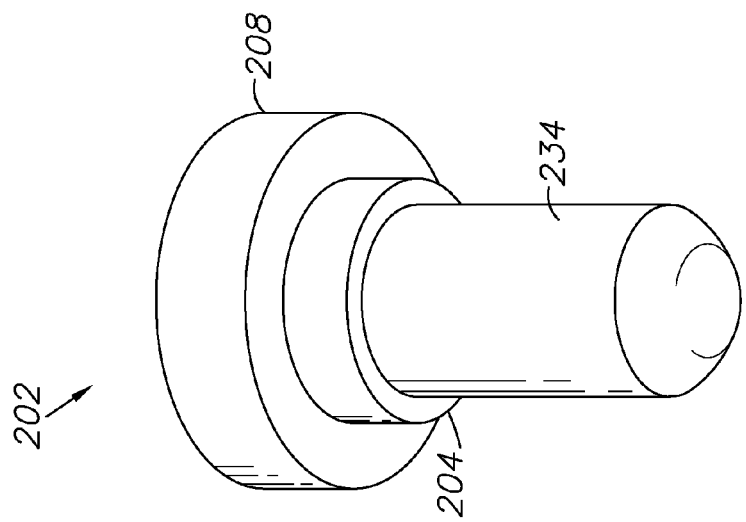
FIG. 24 is a bottom perspective view thereof.
Figure 23:
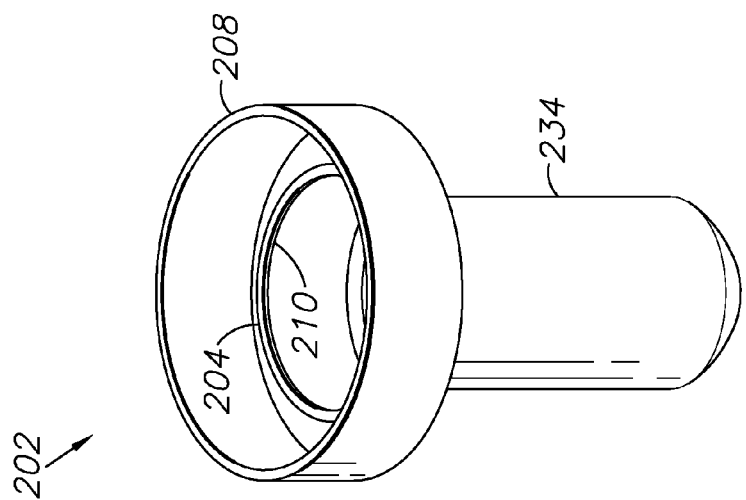
FIG. 23 is a top perspective view of an encapsulation extension embodying another alternative aspect of the present invention.
Figure 26:
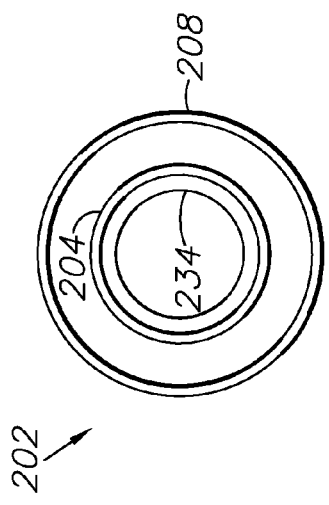
FIG. 26 is a top plan view thereof.
Figure 27:
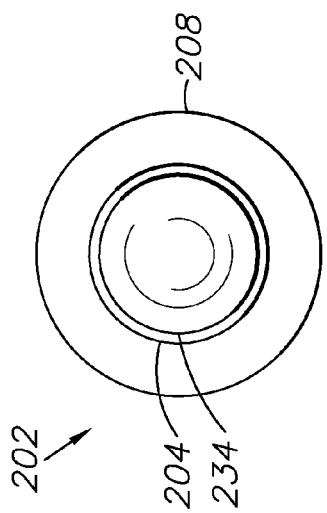
FIG. 27 is a bottom plan view thereof.
Figure 25:
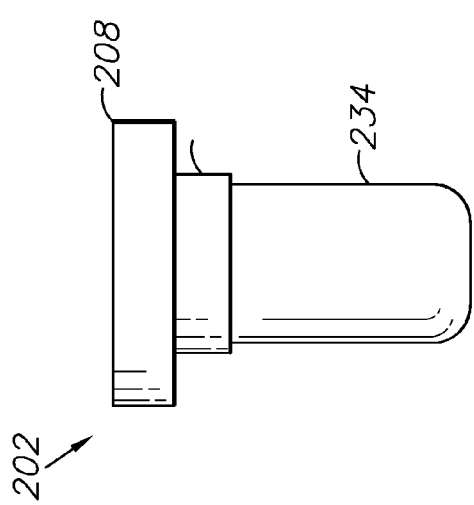
FIG. 25 is a side elevational view thereof.
Figure 31:
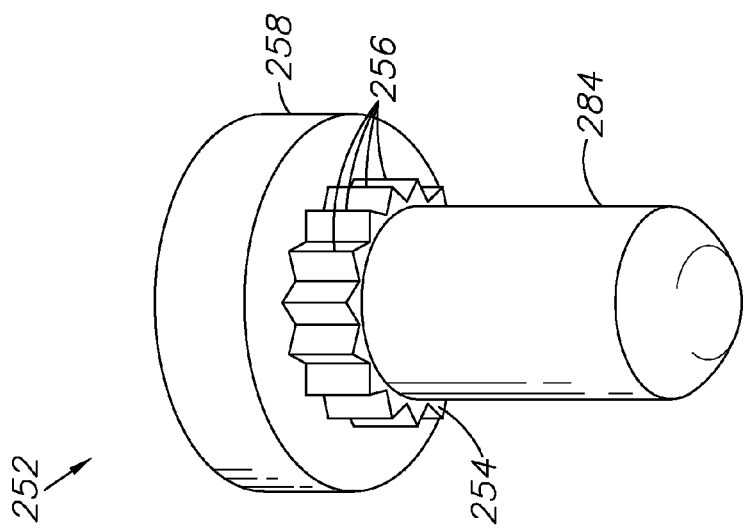
FIG. 31 is a bottom perspective view thereof.
Figure 30:
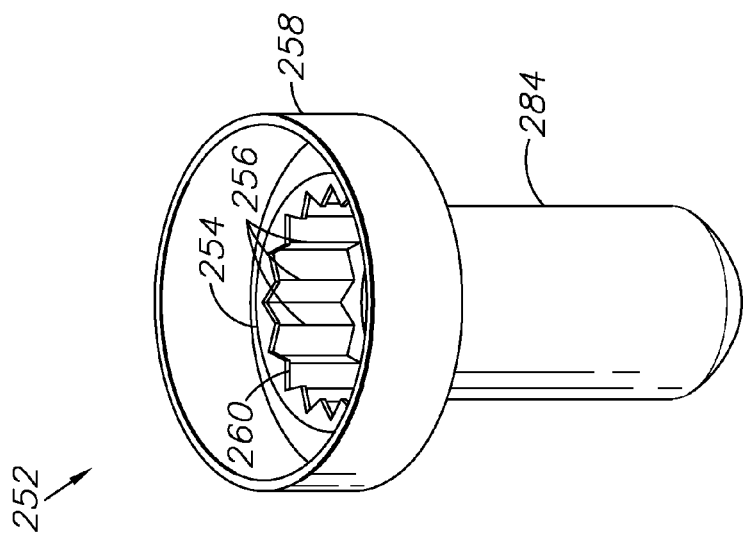
FIG. 30 is a top perspective view of an encapsulation extension embodying another alternative aspect of the present invention.

FIGS. 20-22 show an encapsulated nut 102 comprising another aspect of the invention. A base 108 includes a rib 110 on a side thereof, which can be generally located at a mold match line. The base 108 also includes an annular washer protrusion 112 on its engagement (lower as shown in FIGS. 20-22) face, which has a configuration similar to the construction shown in FIG. 1, and upturned corners 114. A modified nut 116 includes an annular, lower shoulder 118, which receives a corresponding foot 120 of the encapsulation base 108. With the encapsulated nut 102 drawn into engagement with a surface 122 by a bolt 124, the encapsulation base 108 deflects, as shown at 126, and the encapsulation base foot 120 compresses whereby a lower, annular engagement face 128 of the nut 116 is clamped against the surface 122 (FIG. 22). The surface 122 can comprise the surface of a metal, structural component, such as steel plate, whereby a metal-to-metal engagement 130 is formed at the interface of the nut engagement face 128 and the surface 122. The engagement 130 limits further compression of the encapsulation base 108 whereby the foot 120 remains relatively intact and is prevented from being crushed. The foot 120 thus forms a seal 132 with the surface 122.

An encapsulation hat or extension 134 includes multiple, longitudinally-extending ribs 136 within its bore 138, which are similar in construction and function to the splines 74 described above.

FIGS. 23-29 show a nut encapsulation 202 comprising another alternative aspect of the invention. A base 208 is connected to a nut interface 204. The interior portion includes a lip 210 which intercepts the rounded edge 220 of a nut 218, thereby creating a stronger grip against said nut and preventing the encapsulation 202 from pulling away from the nut (shown in more detail at FIG. 29). The encapsulation further includes an encapsulation hat or extension 234.

FIGS. 30-34 show an alternative nut encapsulation 252 which incorporates a similar lip 260, however the nut interface 254 includes a number of teeth 256 which provide additional grip along the flat edges ("flats") and points of a nut or bolt head (not shown). This is preferable because it ensures that an encapsulation will not be pulled from the nut in high-pressure situations, such as when used within large water tanks or the like. The alternative nut encapsulation 252 also includes an encapsulation hat or extension 284, a base 258, and a lip 260 corresponding to the nut interface 254 and the number of jagged teeth 256. FIG. 32 further demonstrates how the encapsulation seals a nut up against the surface of a water tank 286 wherein a bolt 288 is passing through the water tank 286 and is held in place by the encapsulated nut.

It is to be understood that the invention described here in can be embodied in various forms, and is not to be limited to the examples discussed above. Other components and configurations can be utilized in the practice of the present invention.

Having thus described the invention, what is claimed as new and desired to be secured by Letters Patent is:

1. An encapsulated nut, which comprises:
   a rimmed nut with first and second faces, at least one side wall, and an internally-threaded bore extending between and open at said faces;
   said nut having a rounded edge between said first face and said at least one sidewall;
   said nut further including a rim comprising a concave arcuate shoulder at said second face, said concave shoulder being continuous from said second face to said at least one sidewall;
   an encapsulation extension including a tube with proximate and distal ends and a tube bore open at said proximate end and generally aligned with said nut bore;
   an encapsulation base extending from said extension encapsulating said nut, and said tube proximate end, said encapsulation base having an opening at said first face of said nut, said opening providing access to said nut and tube bores;
   said encapsulation base including a lip, said lip including a concave arcuate surface being continuous from said second face to said at least one sidewall of said nut, said lip engaged with said rim such that said base is partially received within said concave arcuate shoulder;
   wherein said nut is located on a surface of a water tank; and
   said lip configured to deform slightly as said nut is tightened, and said second face configured to contact said surface of said water tank after said lip is sufficiently deformed, whereby said lip is prevented from tearing and whereby said base remains partially received within said concave arcuate shoulder.

2. The encapsulated nut of claim 1, further comprising:
   said encapsulation base including a plurality of teeth engaging said nut sides along the flat portions of said sides and along points located at the intersection of two said sides.

3. The encapsulated nut of claim 1, further comprising:
   a bolt including a threaded stem and a bolt head, said stem inserted through said nut bore; and
   wherein said stem extends into said encapsulation extension.

4. The encapsulated nut of claim 3, wherein:
   said bolt head is located on an exterior surface of said water tank.

5. The encapsulated nut of claim 4, wherein said bolt is a carriage bolt.

\* \* \* \* \*